(12) United States Patent
Ichioka et al.

(10) Patent No.: US 7,505,092 B2
(45) Date of Patent: Mar. 17, 2009

(54) DISPLAY DEVICE

(75) Inventors: Hideki Ichioka, Mie (JP); Tomohiko Yamamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 577 days.

(21) Appl. No.: 11/216,586

(22) Filed: Aug. 31, 2005

(65) Prior Publication Data

US 2006/0044490 A1  Mar. 2, 2006

(30) Foreign Application Priority Data

Sep. 2, 2004  (JP)  ............................. 2004-255326

(51) Int. Cl.
G02F 1/1333  (2006.01)
(52) U.S. Cl. ............................. 349/60; 349/58; 349/59
(58) Field of Classification Search .............. 349/58–60
See application file for complete search history.

(56) References Cited

U.S. PATENT DOCUMENTS 6,507,377 B1 * 1/2003 Jung ........................... 349/60

2002/0025441 A1  2/2002  Hieda et al.
2002/0050782 A1  5/2002  Ito et al.
2005/0077826 A1  4/2005  Watanabe et al.

FOREIGN PATENT DOCUMENTS

| EP | 1 134 072 A2 | 9/2001 |
|---|---|---|
| JP | 4-274216 A | 9/1992 |
| JP | 11-174206 | 7/1999 |
| JP | 2000-75306 A | 3/2000 |
| JP | 2001-266759 | 9/2001 |

\* cited by examiner

*Primary Examiner*—David Nelms
*Assistant Examiner*—Phu Vu
(74) *Attorney, Agent, or Firm*—Keating & Bennett, LLP

(57) ABSTRACT

A display device includes a display panel, a first protection layer having viscoelasticity, and a second protection layer having an elastic modulus higher than first protection layer. The first protection layer covers one face of the display panel and the second protection layer is arranged on the first protection layer to cover the display panel.

6 Claims, 4 Drawing Sheets

DISPLAY DEVICE

CROSS REFERENCE TO RELATED APPLICATIONS

This Non-provisional application claims priority under 35 U.S.C. § 119(a) on Patent Application No. 2004-255326 filed in Japan on Sep. 2, 2004, the entire contents of which are hereby incorporated by reference.

BACKGROUND ART

The present invention relates to a display device.

Recently, flat panel display devices such as liquid crystal display devices, electroluminescence display devices (hereinafter referred to as EL display devices), and the like are extensively used as display devices built in mobile electronic tools (hereinafter referred to as "mobile tool"). Such flat panel display devices built in mobile tools are required to have excellent portability and high mechanical durability.

The recent trend for reducing the thickness and the weight and attaining excellent portability of the mobile tools is that display panels, particularly, transparent substrates provided on the surfaces of the display panels are being thinned. The thinned display panels realize reduction in thickness and weight of the display devices while the mechanical durability of the display panels decreases contrarily as the display panel becomes thinner. Under the circumstances, in conventional flat panel display devices, a protection substrate having comparatively high mechanical durability is arranged on the display panel for protecting the display panel, which is brittle (see, for example, Japanese Patent Application Laid Open Publication No. 2001-266759A and Japanese Patent Application Laid Open Publication No. 11-174206A).

SUMMARY OF THE INVENTION

However, if the construction for protecting the display panel by the protection substrate is employed, the protection substrate must be comparatively thick for attaining desired mechanical durability. Further, the protection substrate must be arranged apart from the display panel in order to prevent the display panel, on the surface of which a thin transparent substrate is provided, from a direct impact. For this reason, it is difficult to sufficiently reduce the thickness and the weight of the display device with the construction for protecting the display panel by the protection substrate, resulting in difficulty in attaining excellent portability.

The present invention has been made in view of the above problems and has its object of providing a compact and light-weighted display device having high mechanical durability.

To attain the above object, the present invention provides a display device including: a display panel; a first protection layer which has viscoelasticity and which covers one face of the display panel; and a second protection layer which has an elastic modulus higher than the first protection layer and which is arranged on the first protection layer to cover the display panel.

DETAILED DESCRIPTION OF THE INVENTION

An embodiment of the present invention will be described below with reference to the accompanying drawings.

Figure 1:
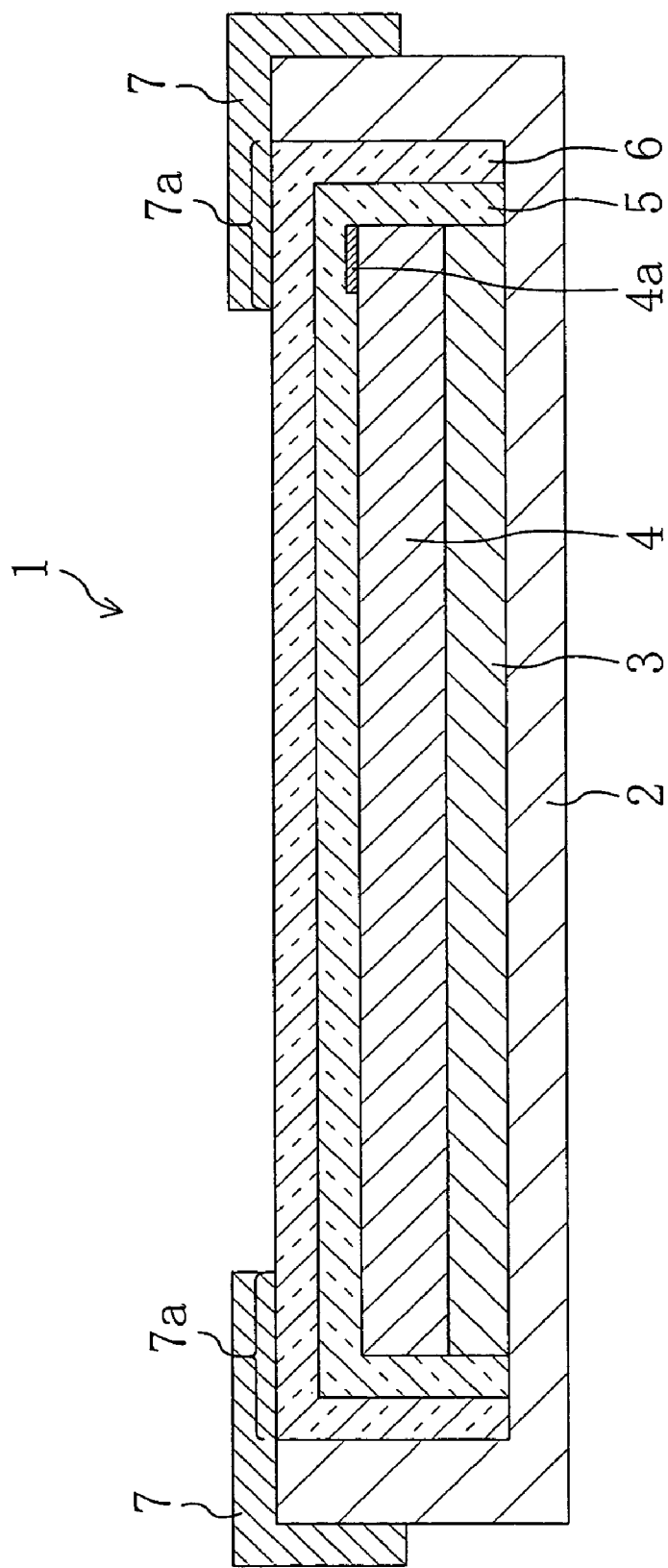
FIG. 1 is a schematic section showing a liquid crystal display device according to an embodiment.

FIG. 1 is a schematic section showing a liquid crystal display device 1 according to the present embodiment.

The liquid crystal display device 1 of the present embodiment includes a liquid crystal display panel 4, a backlight unit 3, a first protection layer 5, a second protection layer 6, a box body 2 for accommodating them, and a bezel 7. The backlight unit 3 is provided on the back face (below in FIG. 1) of the liquid crystal display panel 4. The first protection layer 5 is formed of a member having viscoelasticity and is provided so as to cover an image displaying face, that is the obverse face (above in FIG. 1) and the side face of the liquid crystal display panel 4. The second protection layer 6 has an elastic modulus higher than the first protection layer 5 and is stacked on the first protection layer 5. The bezel 7 is fitted to the box body 2 so as to cover the peripheral part of the second protection layer 6.

The material of the box body 2 may be, for example, a metal such as iron, aluminum, magnesium, and the like, and is not limited only if it can secure the mechanical durability of the liquid crystal display device 1.

The liquid crystal display panel 4 includes an active matrix substrate (not shown) in which a plurality of thin film transistors (not shown) are arranged in matrix, an upper common electrode (not shown) that faces the active matrix substrate, and a liquid crystal layer (not shown) interposed between the active matrix substrate and the upper common electrode. Respective alignment films (not shown) are provided between the liquid crystal layer and the active matrix substrate and between the liquid crystal layer and the upper common electrode.

The first protection layer 5 having the viscoelasticity is provided so as to cover the image displaying face (above in FIG. 1) and the side face of the liquid crystal display panel 4, so that stress applied from outside (especially, stress applied momentarily) is transferred to the liquid crystal display panel 4 with delay in the presence of the first protection layer 5 that exhibits viscous behavior. Accordingly, the stress to be transferred to the liquid crystal display panel 4 is buffered and dispersed. As a result, the liquid crystal display panel 4, which is comparatively brittle, can be protected effectively against the stress applied from outside, attaining high mechanical durability.

Preferably, the behavior of the first protection layer 5, which shows the relationship between a stimulus (stress, strain, and the like) applied from outside and a response thereto, is viscous behavior that can be explained using Voigt model, Kelvin model, Maxwell model, and the like.

Wherein, the "viscoelasticity" means a property that offers both viscosity and elasticity. The member having viscoelasticity shows creeping that increases as time progresses by strain at pressure application, stress relaxation that stress decreases as time progresses, and the like.

Preferably, the first protection layer 5 shows elastic behavior in which the relationship between a stimulus (stress, strain, and the like) applied from outside and a response thereto is nonlinear, namely, the first protection layer 5 has nonlinear elasticity. Also, the first protection layer 5 preferably has low oxygen permeability and low moisture permeability. Wherein, the "nonlinear elasticity" means that an applied load and a displacement amount do not fall in a linear correlation (proportion) within a range that causes no elastic deformation. While, "linear elasticity" means that an applied load and a displacement amount fall substantially in a linear correlation (proportion) within the range that causes no elastic deformation.

Materials suitable for the first protection layer 5 include, for example, amorphous polymer such as ethylene methacrylate copolymer, elastomer, and the like.

The second protection layer 6 having an elastic modulus higher than the first protection layer 5 is provided on the first protection layer 5, so that restoration force (repulsive force) is generated in the second protection layer 6 when the second protection layer 6 is deformed by applying stress from outside. Accordingly, the stress applied from outside is buffered and dispersed in the second protection layer 6 and the first protection layer 5 before the stress reach the surface of the liquid crystal display panel 4. Thus, the stress to be transferred to the brittle liquid crystal display panel 4 can be suppressed effectively, resulting in excellent mechanical durability exhibited.

Further, when another kind of stress such as gradually applied bending force or the like is applied to the liquid crystal display device 1, the applied stress is dispersed in the entirety of the second protection layer 6 with less deformation of the second protection layer 6 because the second protection layer 6 has the comparatively high elasticity. Thus, the brittle liquid crystal display panel 4 is prevented from large local stress, resulting in excellent mechanical durability exhibited.

As descried above, with the use of the first protection layer 5 and the second protection layer 6 in combination, specifically, by stacking the first protection layer 5 and the second protection layer 6 in this order on the liquid crystal display panel 4, stress applied to the liquid crystal display device 1 can be buffered and dispersed effectively. In turn, the liquid crystal display device 1 can have high durability even using the first protection layer 5 and the second protection layer 6, which are comparatively thin. In consequence, the liquid crystal display device 1 is reduced in size and weight and can have high mechanical durability.

Further, the combinational use of the first protection layer 5 and the second protection layer 6 eliminates the need to arrange the first protection layer 5 apart form the liquid crystal display panel 4. Accordingly, the liquid crystal display device 1 attains further weight reduction, suppression of multiple reflection at the interface of the display panel 4, and high luminance.

Preferably, the second protection layer 6 has linear elasticity that the deformation amount of the second protection layer 6 linearly correlates (changes linearly) to external force such as an impact, bending, and the like, and more preferably, the second protection layer 6 can be modeled substantially by Hooke's law.

Materials suitable for the second protection layer 6 include, for example, acrylic resins such as PMMA and the like, polyester resins such as polycarbonate resin (PC), triacetyl cellulose resin (TAC), ARTON (trademark) resin, epoxy resin, polyethylene terephthalate resin (PET), and the like, polyimide resins, polyamide resins, and the like.

Further, the first protection layer 5 and the second protection layer 6 must transmit light from the display panel 4, and therefore, preferably have high light transmittance. With the high light transmittance of the first protection layer 5 and the second protection layer 6, the liquid crystal display device 1 can have high luminance.

The high mechanical durability that the liquid crystal display device 1 of the present embodiment has will be described in detail with reference to the drawings.

Figure 2:
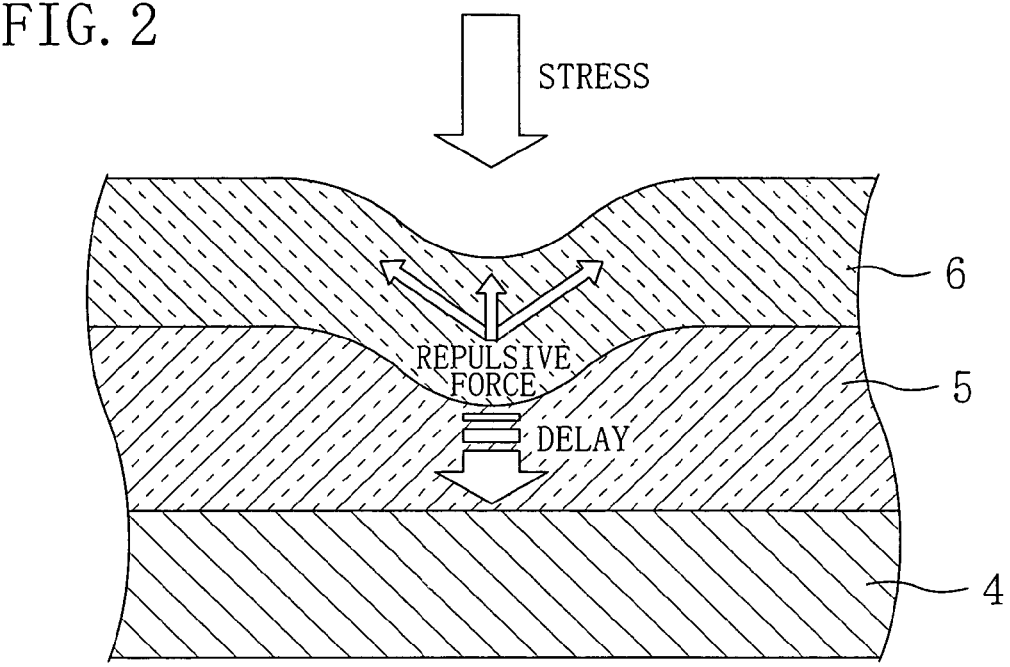
FIG. 2 is a schematic section for explaining each action of a first protection layer and a second protection layer when stress is applied to the central part of the liquid crystal display device.

FIG. 2 is a schematic section for explaining each action of the first protection layer 5 and the second protection layer 6 when stress is applied to the central part of the liquid crystal display device 1.

Figure 3:
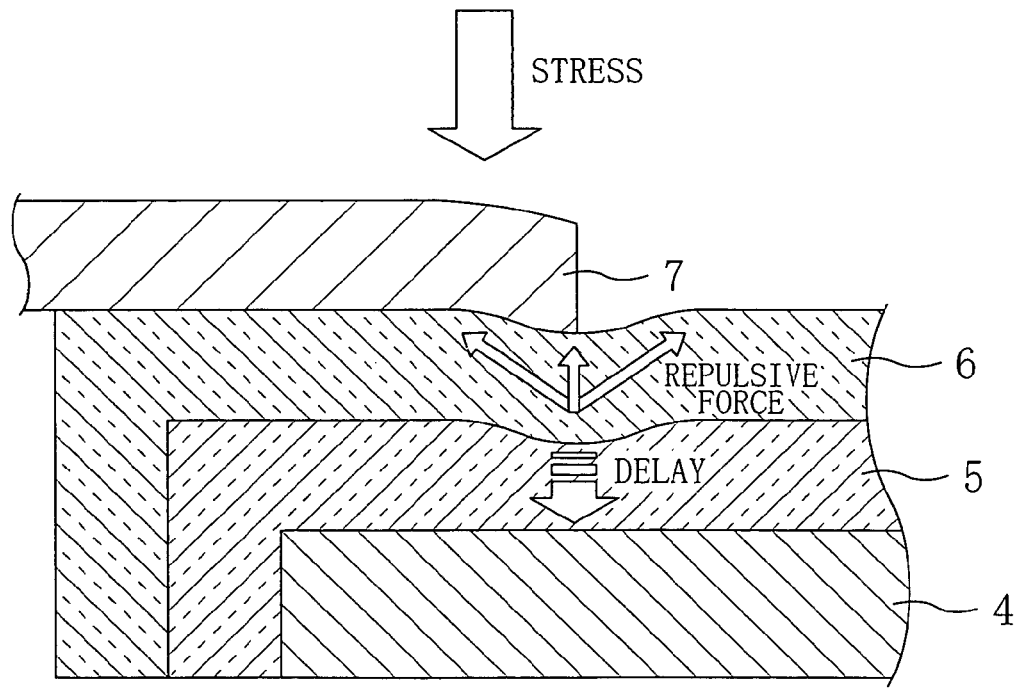
FIG. 3 is a schematic section for explaining each action of the first protection layer and the second protection layer when stress is applied to a bezel of the liquid crystal display device.

FIG. 3 is a schematic section for explaining each action of the first protection layer 5 and the second protection layer 6 when stress is applied to the bezel 7 of the liquid crystal display device 1.

Figure 4:
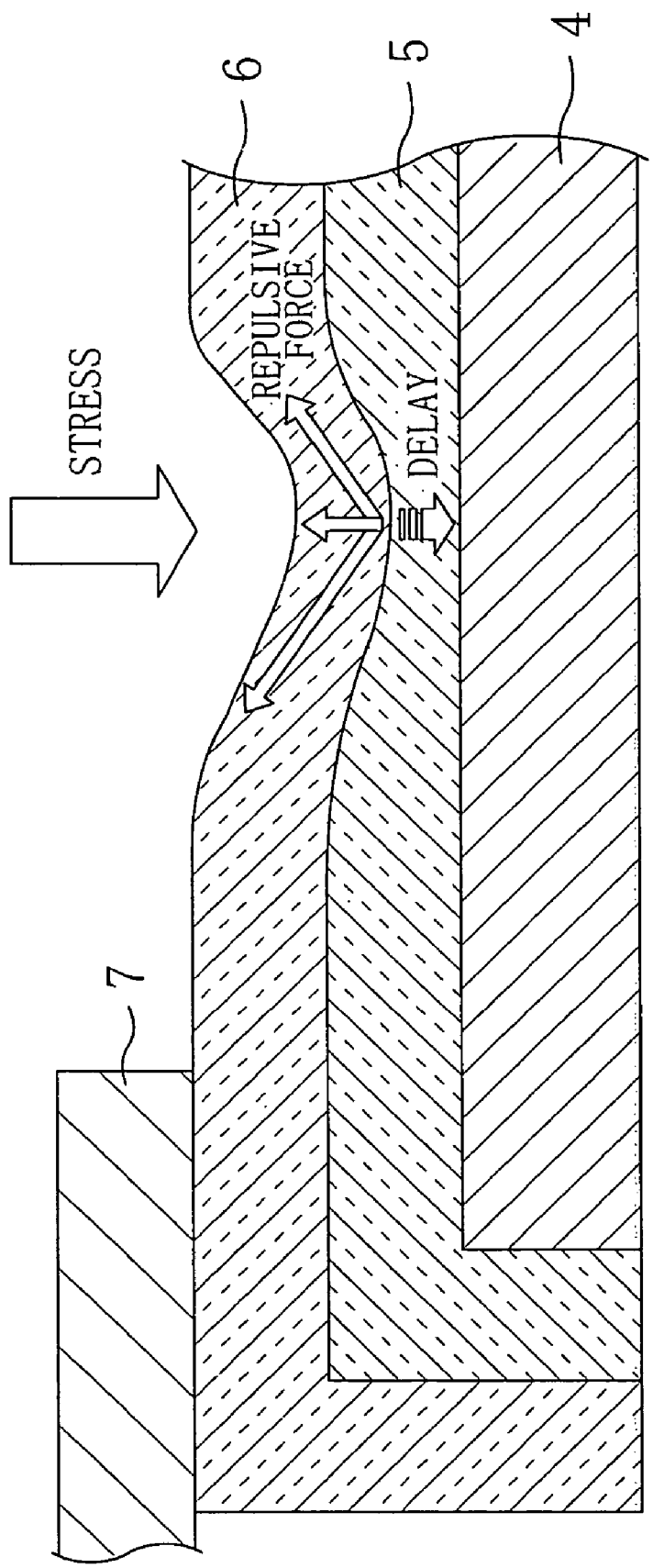
FIG. 4 is a schematic section for explaining each action of the first protection layer and the second protection layer when stress is applied to the peripheral part of the second protection layer.

FIG. 4 is a schematic section for explaining each action of the first protection layer 5 and the second protection layer 6 when stress is applied to the peripheral part of the second protection layer 6.

As described above, the first protection layer 5 has the viscoelasticity, and strain r (t) at the time (t) when certain stress [σ] is applied to the first protection layer 5 is expressed by Expression 1 as follows.

$$r(t)=(\sigma/E)\times(1-e^{-Et/\eta})$$ (Expression 1)

Wherein, E indicates an elastic modulus and η indicates a viscosity.

Further, a time delay (τ) is expressed by the relationship in Expression 2 as follows.

$$\tau=\eta/E$$ (Expression 2)

When Expression 2 is substituted by Expression 1, Expression 3 as follows is obtained.

$$r(t)=(\sigma/E)\times(1-e^{-t/\tau})$$ (Expression 3)

It is understood from Expression 3 that only momentary elastic deformation occurs in the case where no dashpot is provided (η=0), namely, when the time delay τ is 0. While, in the case where dashpots are connected in parallel with each other to offer the viscosity η as in Voigt model, the time delay τ increases as the viscosity η is increased according to Expression 2. Accordingly, as can be understood from Expression 3, momentary strain r (t) is suppressed while stress (especially, a momentarily applied impact, stress, and the like) applied from outside is buffered and suppressed. Thus, an impact and stress to be transferred from outside to the brittle liquid crystal display panel 4 can be suppressed effectively, resulting in excellent mechanical durability exhibited.

As described above, the first protection layer 5 exhibits an excellent effect on momentarily applied stress while less exhibiting an effect of delayed force transfer on gradually applied stress. However, with the use of the first protection layer 5 and the second protection layer 6 in combination, specifically, by providing the second protection layer 6 on the first protection layer 5 on the liquid crystal display panel 4, gradually applied stress can be buffered and dispersed as well. Namely, by providing the first protection layer 5 and the second protection layer 6, the liquid crystal display device 1 can exhibits high durability against both momentarily applied stress and gradually applied stress.

The principle that the second protection layer 6 buffers and disperses gradually applied stress is as follows.

When stress is applied gradually, the second protection layer 6 having a large elastic modulus is less deformed and transfers and disperses the applied stress to the entirety of the first protection layer 5. Thus, the stress to be transferred to the liquid crystal display panel 4 through the first protection layer 5 is buffered and dispersed effectively. As a result, the stress to be transferred to the brittle display panel 4 can be suppressed effectively, attainting excellent mechanical durability.

As shown in FIG. 4, the first protection layer 5 and the second protection layer 6 cover the side face of the liquid crystal display panel 4. Accordingly, when a large impact, stress, or the like is applied to the side face of the liquid crystal display device 1, such as the case when the liquid crystal display device 1 is allowed to fall with the side face thereof first, the stress to be transferred to the liquid crystal display panel 4 can be suppressed effectively with no collision of the liquid crystal display panel 4 with the box body 2, the bezel 7, and the like involved, attainting excellent mechanical durability.

The first protection layer 5 is provided so as to cover a terminal section 4a at the peripheral part of the liquid crystal display panel 4, so that stress applied to the terminal section 4a can be suppressed effectively. In consequence, disconnection and the like in the terminal section 4a can be prevented.

If the first protection layer 5 has comparatively low moisture and oxygen permeability, the terminal section 4a, which is rather liable to be degraded due to the presence of moisture, oxygen, and the like, is shut off from oxygen and moisture effectively. Hence, high reliability can be attained.

Further, the liquid crystal display device 1 includes the bezel 7 that is fixed to the box body 2 and covers the peripheral part of the second protection layer 6.

The bezel 7 is made of a metal material having hardness grater than the second protection layer 6, such as iron, aluminum, magnesium, and the like, and serves to protect the peripheral part of the display panel 4.

As shown in FIG. 3, with the bezel 7 provided, almost all part of stress applied to the bezel 7 is absorbed by the bezel 7 itself. Also, even if the stress applied to the bezel 7 is transferred to the second protection layer 6, the second protection layer 6 and the first protection layer 5 exhibit the effect of buffering and dispersing the stress. Thus, excellent mechanical durability is attained.

The flexural rigidity of the second protection layer 6 is determined depending on the elastic modulus E that the material forming the second protection layer 6 has and the geometrical moment of inertia I in the structure of the second protection layer 6. For example, when the second protection layer 6 is supported at two points with a distance L left from each other and a load P is applied to the second protection layer 6 in the three-point bending, the maximum amount δmax of flexure is expressed by Expression 4 as follows.

$$\delta max = \beta \times (P \times l^3)/(E \times I) \quad \text{(Expression 4)}$$

Wherein, β is a factor determined depending on the state of the applied load P and the state of the supported second protection layer 6 assumed at that time.

Figure 5A:
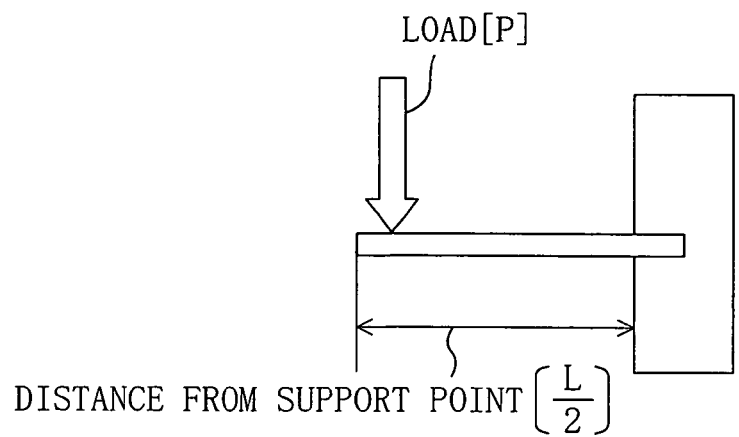
FIG. 5A to FIG. 5C are diagram for explaining the relationship between a factor β and the state where the second protection layer is supported.
Figure 5B:
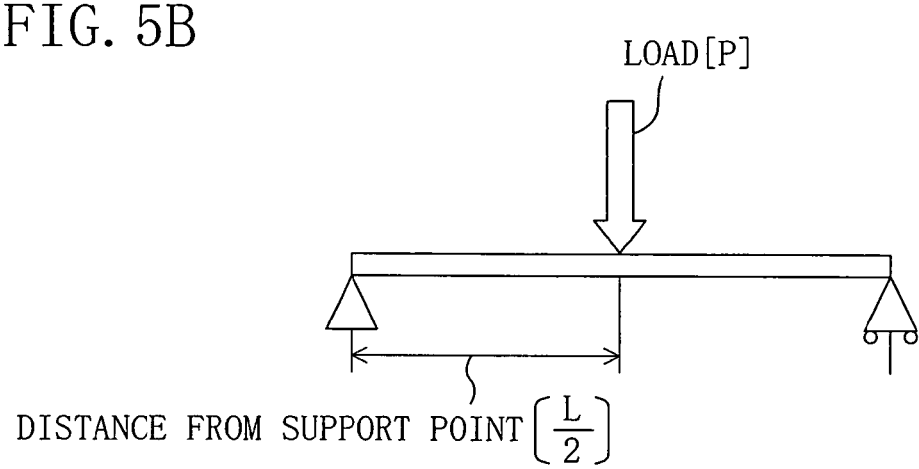

FIG. 5 is a diagram for explaining the relationship between the supported state and the factor β of the second protection layer 6.

When stress is applied to the peripheral part of the second protection layer 6 with no bezel 7 provided and the peripheral part of the second protection layer 6 not fixed, the second protection layer 6 shows flexural behavior as that of a beam of which one end is free as shown in FIG. 5A. In this case, the factor β is 1/24. When stress is applied to the central part of the second protection layer 6, the protection layer 6 shows flexural behavior as that of a beam of which both ends are supported. In this case, the factor β is 1/48.

In this way, the factor β in the case where stress is applied to the peripheral part of the second protection layer 6 is twice as large as that in the case where stress is applied to the central part thereof. Therefore, the maximum amount δmax of flexure in the case where the stress is applied to the peripheral part of the second protection layer 6 corresponds to a double of the maximum amount δmax of flexure in the case where stress is applied to the central part thereof, as expressed by Expression 4. Namely, the peripheral part is susceptible double of the central part to stress from outside.

However, in the liquid crystal display device 1 in the present embodiment, the peripheral part, which is susceptible to influence of the stress from outside, is covered with the bezel 7 having high rigidity. Hence, damages by an impact, stress, and the like to the liquid crystal display panel 4 can be suppressed effectively, attainting excellent mechanical durability.

Figure 5C:
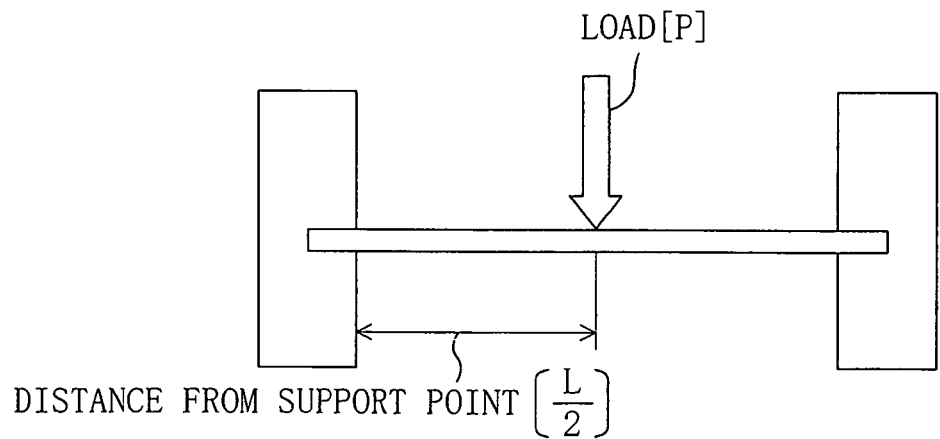

Further, in the liquid crystal display device 1 of the present embodiment, the peripheral part of the second protection layer 6 adheres and is fixed to the bezel 7 at an adhesive face 7a of the bezel 7. With the peripheral part of the second protection layer 6 fixed to the bezel 7, the second protection layer 6 shows flexural behavior as that of a beam of which both ends are fixed as shown in FIG. 5C. In this case, the factor β is 1/192, which is 1/8 of the factor β where the flexural behavior is exhibited in the case where one beam end is free and 1/4 of the factor β where the flexural behavior is exhibited in the case where both beam ends are supported. Thus, by fixing the peripheral part of the second protection layer 6 to the bezel 7, stress to be transferred to the liquid crystal display panel 4 can be suppressed effectively. Especially, when stress is applied to a part of the second protection layer 6 in the vicinity of the bezel 7, further greater restoration force (repulsive force) is generated, as shown in FIG. 4, to suppress the stress to be transferred to the liquid crystal display panel 4 effectively. As a result, excellent mechanical durability can be attained.

In addition, by fixing the second protection layer 6 to the bezel 7, the geometrical moment of inertia of the liquid crystal display device 1 including the box body 2 becomes greater, increasing the strength against bending and torsion of the liquid crystal display device 1.

It is noted that the scheme for fixing the second protection layer 6 to the bezel 7 is not limited. For example, the second protection layer 6 may be allowed to adhere and be fixed to the bezel 7 with a two-sided adhesive tape or the like.

MODIFIED EXAMPLES

As described above, a liquid crystal display device is explained as an example in the above embodiment but the present invention is not limited to the liquid crystal display device and is applicable to various display devices such as EL display devices, plasma display devices, and the like.

An area lighting type is employed for the liquid crystal display device 1 in the above embodiment, wherein the backlight unit 3 is arranged on the back face of the liquid crystal display panel 4. However, the present invention is not limited to such a display device of area lighting type and may be applied to display devices of edge lighting type.

Further, in a case of a reflective liquid crystal display device, a spontaneous light emitting display device (for example, an EL display device, a plasma display device, and the like), the backlight unit 3 is not necessarily needed.

The liquid crystal display device 1 of the above embodiment uses, as the liquid crystal display panel 4, an active matrix display panel having a plurality of thin film transistors (not shown), but may use a passive matrix liquid crystal display panel, and the like.

In the above embodiment, the first protection layer 5 and the second protection layer 6 cover the side face of the liquid crystal display panel 4, but may cover only the image display face (one face) of the liquid crystal display panel 4.

In the above embodiment, the bezel 7 covers the outer periphery of the box body 2, but may be provided inside the box body 2 (within the concave portion for accommodating the liquid crystal display panel 4 and the like) so as to cover the peripheral part of the liquid crystal display panel 4.

Moreover, in the liquid crystal display device 1 of the above embodiment, the second protection layer 6 is fixed to the bezel 7, but may be fixed to the box body 2 without the bezel 7 provided. Even in this case, the same effect as in the case where the second protection layer 6 is fixed to the bezel 7, that is, the effect of buffering and dispersing stress that the second protection layer 6 receives can be obtained, attaining further excellent mechanical durability.

In addition, an optical film, such as a polarizing film, a retardation film, and the like may be fitted to each or one of the first protection layer 5 and the second protection layer 6, and the surfaces of the first protection layer 5 and/or the second protection layer 6 may be subjected to antireflection treatment, antistatic treatment, and the like. Each of such structures attains excellent mechanical durability.

The preferred embodiments of the present invention are described as above, but the technical scope of the present invention is not limited to the scope recited in the above embodiments. The above embodiments are only examples and persons skilled in the art naturally understood that every constitutional element and every processing in the embodiments can be combined and various modifications are possible and that the modifications are also within the scope of the present invention.

What is claimed is:

1. A display device, comprising:
   a display panel;
   a first protection layer which has viscoelasticity and which covers one face of the display panel;
   a second protection layer which has an elastic modulus higher than the first protection layer and which is arranged on the first protection layer to cover the display; and
   a bezel that covers a peripheral part of the second protection layer;
   wherein the second protection layer is fixed to the bezel.

2. The display device of claim 1,
   wherein the first protection layer has nonlinear elasticity, and
   the second protection layer has linear elasticity.

3. A display device, comprising:
   a display panel;
   a first protection layer which has viscoelasticity and which covers one face of the display panel; and
   a second protection layer which has an elastic modulus higher than the first protection layer and which is arranged on the first protection layer to cover the display panel;
   wherein the first protection layer covers the one face of the display panel and further covers a side face of the display panel.

4. A display device, comprising:
   a display panel;
   a first protection layer which has viscoelasticity and which covers one face of the display panel; and
   a second protection layer which has an elastic modulus higher than the first protection layer and which is arranged on the first protection layer to cover the display panel; wherein
   the display panel includes at a peripheral part thereof a terminal section; and
   the terminal section is covered with the first protection layer.

5. A display device, comprising:
   a display panel;
   a first protection layer which has viscoelasticity and which covers one face of the display panel;
   a second protection layer which has an elastic modulus higher than the first protection layer and which is arranged on the first protection layer to cover the display panel; and
   a box body that accommodates the display panel;
   wherein the second protection layer is fixed to the box body.

6. The display device of claim 1,
   wherein the display panel is a liquid crystal display panel.

* * * * *